April 21, 1953  C. M. CHAPIN  2,635,260
AUTOMATIC TOOL RELEASING CLUTCH
Filed Feb. 21, 1948  2 SHEETS—SHEET 1

INVENTOR:
CHESTER M CHAPIN
BY Rodney Bedell
ATTORNEY.

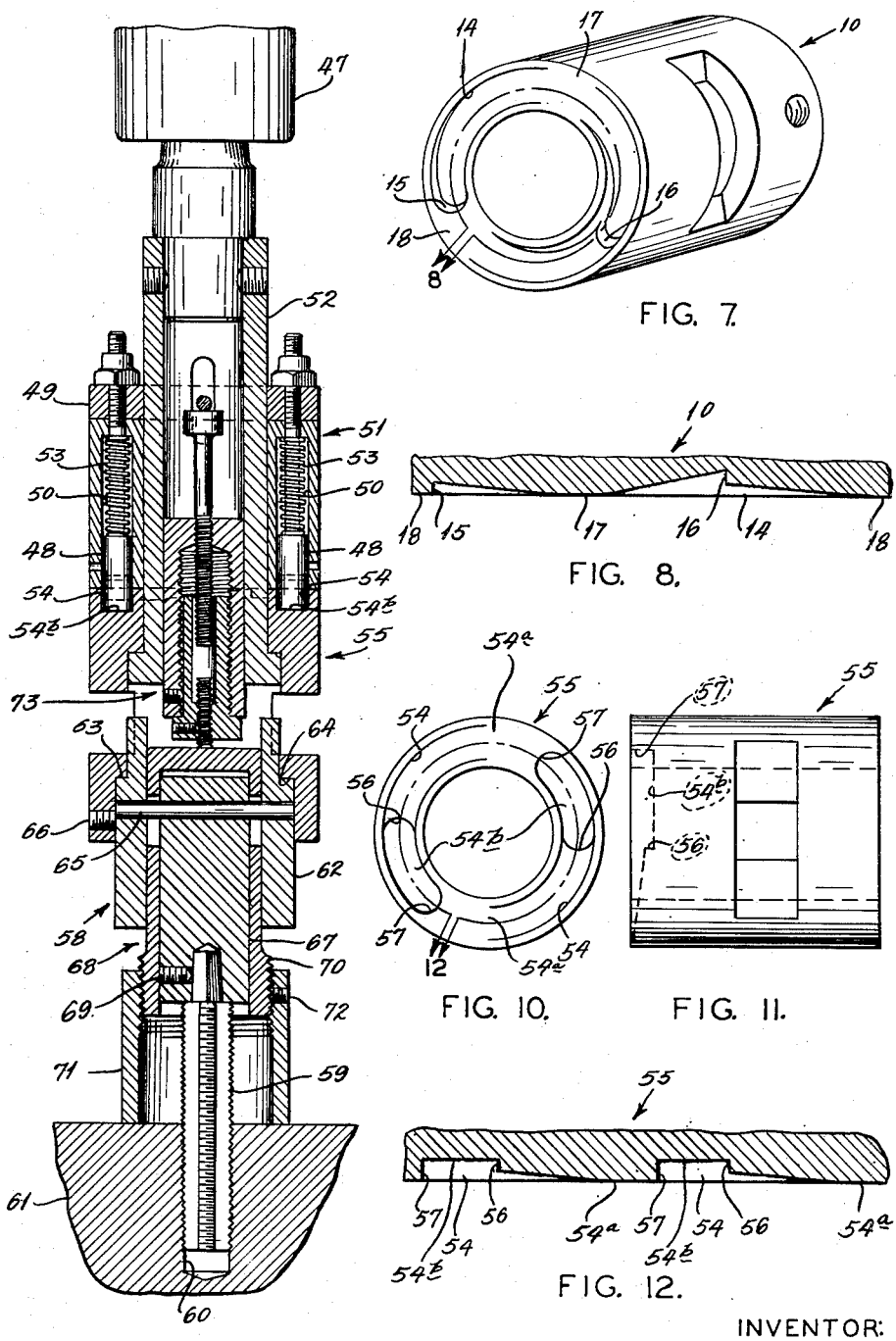

Patented Apr. 21, 1953

2,635,260

UNITED STATES PATENT OFFICE 2,635,260

AUTOMATIC TOOL RELEASING CLUTCH

Chester M. Chapin, St. Louis, Mo.

Application February 21, 1948, Serial No. 10,154

4 Claims. (Cl. 10—89)

The invention relates to devices for mounting threading tools, such as taps and dies, and for use on lathes, drill presses or other machines having rotating spindles to provide relative rotation between the tool and a work piece to be threaded.

One object of the invention is to automatically stop the threading of a work piece at any desired point without stopping rotation of the machine in which the device is used.

Another object is to withdraw the threading tool from the work piece when threading is completed merely by reversing the direction of rotation of the machine.

Another object is to provide a production tool for rapid and uniform threading of each of a number of substantially identical work pieces.

Other objects will be apparent to those skilled in the art from the following description and accompanying drawings, in which.

Figure 1:
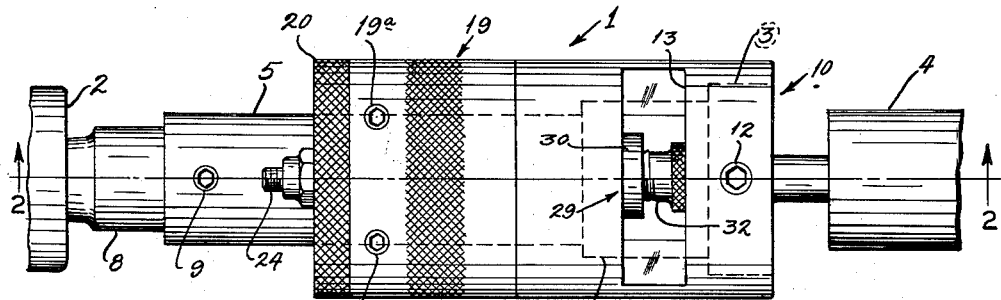
Figure 1 is a top view of a device constructed according to the invention and provided with a die for threading a work piece.
Figure 2:
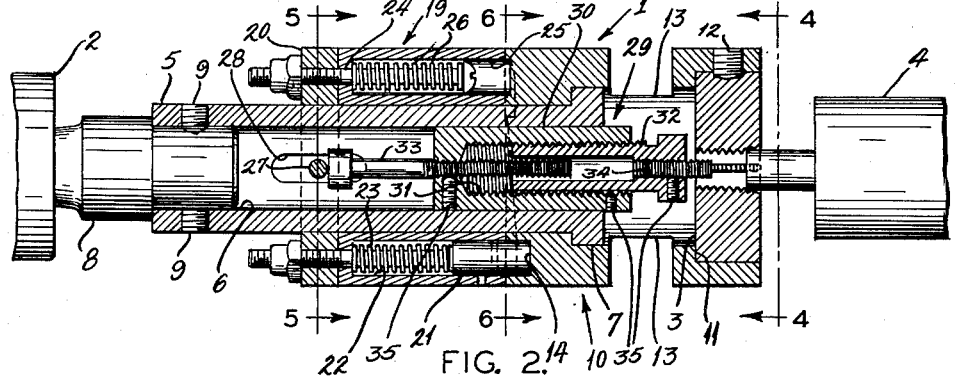
Figure 2 is a longitudinal vertical section taken approximately on the line 2—2 of Figure 1 and showing the device at the start of a threading operation.
Figure 4:
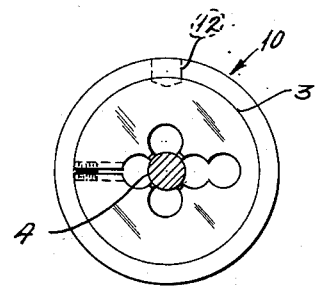
Figures 5, 6:
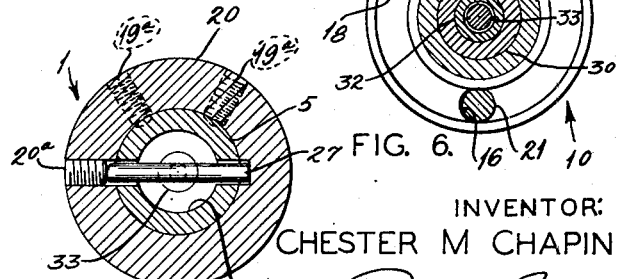

Figures 4, 5 and 6 are transverse vertical sections taken approximately on the lines 4—4, 5—5 and 6—6, respectively, of Figure 2.

Figure 7 is a perspective of a holder for the tool and shows a clutch face formed in the holder.

Figure 8 is a section on the annulus 8 of Figure 7 developed into a plane.

Figure 9 is a view similar to Figure 2 and shows the device with another form of clutch and with an adapter for mounting a tap.

Figure 10 is an end view of the holder for the tool in Figure 9 and shows the associated clutch face.

Figure 11 is a side view of the holder shown in Figure 10.

Figure 12 is a section on the annulus 12 of Figure 10 developed into a plane.

The tool mounting device 1 shown in Figures 1–8 is held against rotation in a tail stock 2 of a lathe and mounts a die 3 for threading a rotating work piece 4 mounted in a chuck on the head stock (not shown) of the lathe. The device comprises a cylindrical base 5 having an axial bore 6 extending therethrough and a collar 7 at one of its ends. An adapter 8 for mounting the device on tail stock 2 extends into bore 6 at the other end of the base and is secured to the base by set screws 9.

A holder 10 is rotatable on base 5 adjacent collar 7 and extends forwardly of the adjacent end of the base. Die 3 is received in the forward end of holder 10 and abuts a shoulder 11. A set screw 12 secures die 3 to holder 10. Holder 10 is slotted at 13 to provide for the removal of thread cuttings and other foreign material. One or more arcuate recesses 14 are formed in the left-hand face of holder 10 and form shoulders 15, 16, of different depth, facing in opposite directions angularly of the holder axis. Shoulder 15 extends inwardly from the surface of holder 10. Shoulder 16 extends inwardly of holder 10 from a point at the level of the bottom of shoulder 15. Grooves 14 slope in opposite directions from the inner ends of shoulders 15 and 16 to the surface of holder 10 at 17 and grooves 14 slope from the outer end of shoulder 16 to the surface of holder 10 at 18 adjacent shoulder 15.

A sleeve 19, alined with holder 10, is secured to base 5 by set screws 19a and cooperates with collar 7 to restrain lengthwise movement of holder 10 on base 5. A ring 20 slides on base 5 adjacent sleeve 19 and mounts a plunger 21 extending longitudinally of the base through a passage 22 in sleeve 19 and into grooves 14. A compression spring 23 in passage 22 urges plunger 21 into grooves 14 and thrusts ring 20 against sleeve 19. A bolt 24 is mounted on ring 20 diametrically opposite plunger 21 and extends into a passage 25 in sleeve 19. To prevent ring 20 from cocking on base 5 under the tension of spring 23, a similar compression spring 26 is mounted on bolt 24 in passage 25 and further thrusts ring 20 against sleeve 19.

A pin 27 extends diametrically through ring 20 and base 5. A set screw 20a holds pin 27 assembled to ring 20. Base 5 is slotted longitudinally at 28 to accommodate pin 27 and provide for sliding movement of ring 20.

Figure 3:
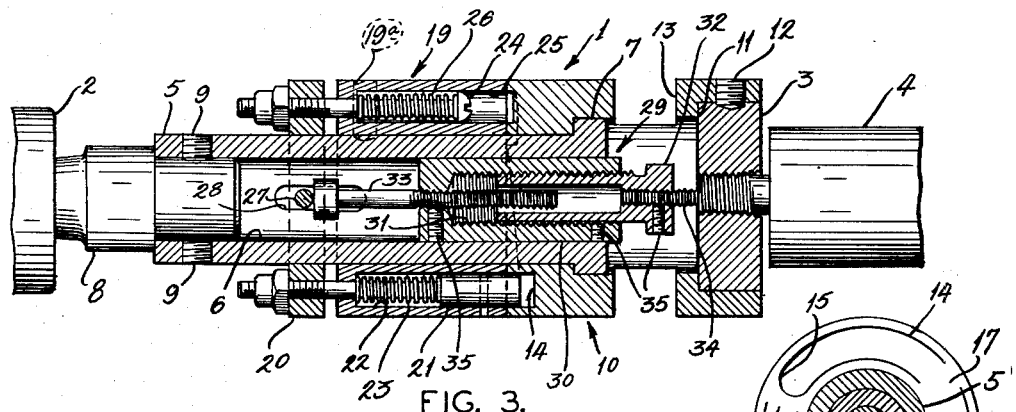
Figure 3 is a view similar to Figure 2 showing the device when the work piece has been threaded a predetermined length.

An elongated piston 29 slides within bore 6 in base 5. Piston 29 includes a cylindrical part 30 slidable in bore 6 and having a threaded passage 31 receiving a threaded tube 32. A screw 33 is threaded into the other end of piston 29 and engages pin 27. A screw 34 is threaded into tube 32 and engages work piece 4 near the end of a threading operation as shown in Figure 3. Part 30, tube 32 and screws 33 and 34 may be rotated relative to one another to adjust the effective length of piston 29, of which they form a part, and are maintained in adjustment by set screws 35. The effective length of piston 29 determines the length of thread on work piece 4. Work piece 4 normally is disengaged from piston 29 until just prior to the end of the threading operation when work piece 4 engages screw 34 of piston 29 and moves piston 29, ring 20 and plunger 21 toward tail stock 2 until plunger 21 is disengaged from shoulder 16, as shown in Figure 3. Holder 10 then rotates with work piece 4 in a counterclockwise direction due to the friction between the work and the holder die (Figures 6 and 7). Plunger 21 slides on the inclined portion of groove 14 to the left of shoulder 16 (Figure 6) and is moved outwardly to the surface of holder 10 at 18, drops into a groove 14 adjacent shoulder 15, slides on the inclined portion of the groove adjacent shoulder 15 and is again moved outwardly to the end surface of holder 10 at 17, then slides inwardly on the inclined portion of the next groove until its movement is limited by ring 20 but clears shoulder 16 and again slides outwardly on the inclined portion of the groove to the left of shoulder 16. When the direction of rotation of the machine is reversed, sleeve 10 rotates with work piece 4 in the opposite direction, until plunger 21 engages shoulder 15, and holder 10 is held against further rotation while work piece 4 is unthreaded therefrom.

The device shown in Figures 9–12 is mounted for rotation in the chuck 47 of a drill press and for threading a stationary work piece 61. The device is substantially the same as the device shown in Figures 1–8 except that a pair of plungers 48 are mounted diametrically opposite on a ring 49 and extend through passages 50 in a sleeve 51 rigid with base 52. Plungers 48 are urged by springs 53 into annular grooves 54 in a tool holder 55 for engagement with pairs of opposing shoulders 56 and 57. The shoulders of each pair are positioned diametrically opposite.

Shoulders 56 are approximately half the height of shoulders 57 which extend inwardly from the surface of holder 55. The bottoms of the shoulders are at the same level but shoulders 56 are approximately one-half the height of shoulders 57. The portion 54b of one groove 54 between the inner ends of each shoulder 56 and the associated shoulder 57 is substantially uniform in depth. Grooves 54 slope outwardly from the outer ends of shoulders 56 to the surface of holder 55 at 54a.

Holder 55 mounts an adapter 58 provided with a tap 59 for threading a recess 60 in a work piece 61. Adapter 58 comprises a tube 62 shouldered at 63 and abutting an associated shoulder 64 in holder 55. A lock screw 66 secures tube 62 to holder 55. A pin 65 extends diametrically through tube 62 within tool holder 55 and rigidly mounts a cylindrical tap holding element 67 and slidably mounts a cap 68 for engaging work piece 61 just prior to recess 60 being threaded to a desired depth. Tap 59 is held in element 67 by a set screw 69. Cap 68 comprises a part 70 and a part 71 threaded together so that the overall length of cap 68 may be adjusted. A set screw 72 holds the parts 70 and 71 against relative rotation after adjustment. Cap 68 engages a piston 73 slidable in base 52.

When the threading of recess 60 has proceeded to a desired depth, piston 73 moves ring 49 away from sleeve 51 until plungers 48 are disengaged from shoulders 56 and base 52 rotates relative to holder 55. Plungers 48 slide in a clockwise direction (Figure 10) over the outwardly inclined portions of grooves 54 adjacent shoulders 56 to the surface of holder 55 at 54a, then drop into grooves 54 adjacent shoulders 57 at 54b until their movement is limited by ring 49, clear shoulders 56 and slide on the outwardly inclined portions of grooves 54 adjacent shoulders 56. When the direction of rotation of the drill press is reversed, plungers 48 engage shoulders 57 and tool holder 55 rotates with base 52 and is unthreaded from work piece 61.

When the device is used with a lathe, the tail stock of the lathe floats on the lathe bed and provides for the lengthwise movement of the tool as the work piece is threaded. When the device is used on a drill press, the vertical movement of the chuck provides for lengthwise movement of the tool.

The device may be adjusted for threading a work piece any desired distance and the device may be used in production for rapid and uniform threading of each of a number of approximately identical work pieces.

The size, depth, and arrangement of the grooves and other details of construction may be varied substantially without departing from the spirit of the invention, and the exclusive use of those modifications coming within the scope of the claims is contemplated.

What is claimed is:

1. In a device of the kind described, a cylindrical base having an axial bore, a holder for a threading tool rotatably mounted on the base but non-slidable thereon, said holder having an end facing longitudinally of the base and provided with arcuate grooves, the bottoms of said grooves being inclined relative to the end of the holder and having steps forming lateral shoulders facing in opposite directions, a cylindrical sleeve surrounding the base and having longitudinal passages at opposite sides of the base and opposite to said grooves, spring thrust plungers slidable in said passages and projecting from the end of the sleeve into said grooves and having reduced diameter portions slidably fitting in the opposite end of the sleeve and projecting therefrom, a ring surrounding and slidable on the base, said plunger portions being secured to the ring, a pin and slot connection between the ring and base limiting the sliding movement of the ring on the base and holding them against relative rotation about the axis of the base, and an elongated element movable longitudinally of the base and having opposite extremities disposed to engage the work and the pin connection between said ring and base to move said ring and plungers away from the grooved end of the sleeve to free the plungers from the lateral shoulders.

2. A device as described in claim 1 in which the grooves have oppositely facing shoulders of different heights, there being means limiting the movement of the elongated element to clear the projecting plungers from the lower of said shoulders but not from the higher of said shoulders.

3. In a rotating tool mechanism of the class described, a base member having an axial bore, a ring surrounding said base member and slidable thereon, the base member having a longitudinal slot abreast of said ring, a pin extending diametrically through said ring and slot, a sleeve surrounding said base member and fixed thereto, elongated passages in said sleeve at opposite sides of the base member, spring-thrust plungers in said passages and projecting therefrom and connected to said ring to limit the spring-thrust movement of said plungers, and a tool holder rotatably mounted upon the base and having arcuate grooves in an end opposite to said sleeve and adapted to receive said plungers, said grooves being shouldered to engage the sides of said plungers, and a thrust element surrounding and rotatable on said tool holder and slidable thereon and in said base and adapted to engage the work at one end and said ring pin at the other end to shift said ring and plungers relative to said tool holder.

4. A rotating tool mechanism as described in claim 3 in which the thrust member comprises a plurality of parts, adjustable lengthwise of the mechanism, and locking means therefor to vary the effective length of the thrust member according to the desired movement of the tool along the work, the tool holder having lateral openings spaced from its tool holding portion longitudinally of the mechanism and providing unobstructed access from the exterior of the mechanism to the locking means for such adjustment.

CHESTER M. CHAPIN.

References Cited in the file of this patent

UNITED STATES PATENTS

| Number | Name | Date |
|---|---|---|
| 496,420 | Leland | May 2, 1893 |
| 671,447 | Morgan | Apr. 9, 1901 |
| 796,205 | Graham | Aug. 1, 1905 |
| 915,201 | Miller | Mar. 16, 1909 |
| 915,568 | Douglas | Mar. 16, 1909 |
| 991,785 | Klocke | May 9, 1911 |
| 1,045,598 | Oatman | Nov. 26, 1912 |
| 1,463,497 | Bugatti | July 31, 1923 |
| 2,040,344 | Stull | May 12, 1936 |
| 2,406,204 | Dansel | Aug. 20, 1946 |

FOREIGN PATENTS

| Number | Country | Date |
|---|---|---|
| 50,860 | Switzerland | May 21, 1910 |
| 462,587 | Great Britain | Mar. 11, 1937 |